Sept. 4, 1951   G. C. HESSNEY ET AL   2,566,329
TIRE CASING OR SIMILAR LAMINATED ARTICLE
Filed May 27, 1947
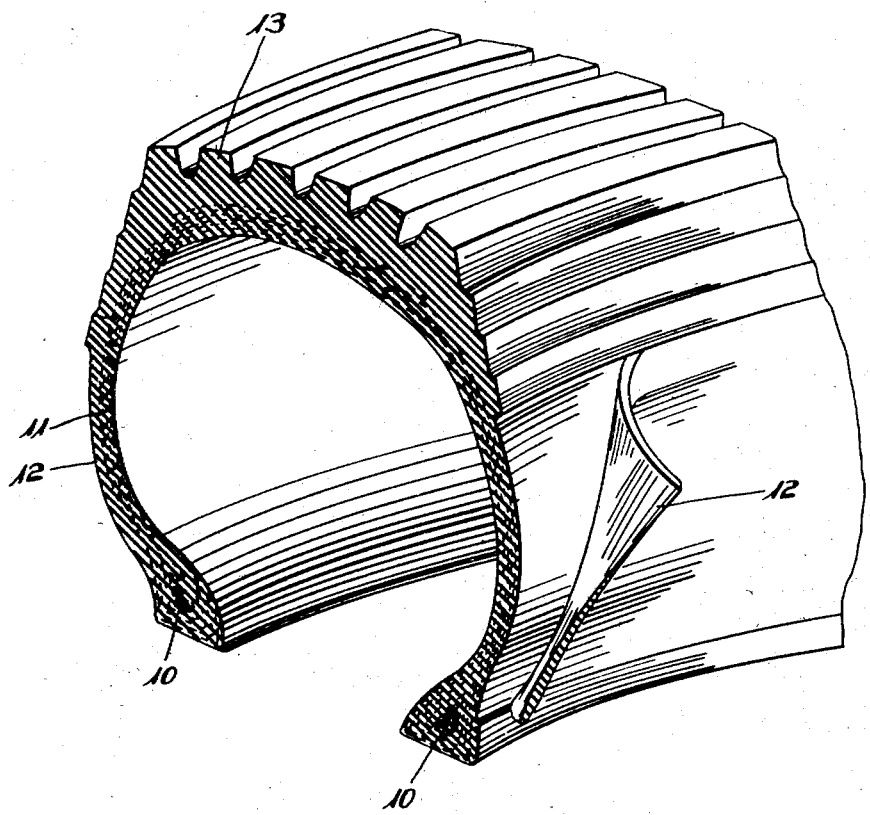
Inventors
George C. Hessney
John W. Martindale
By Robert W. Furlong
Atty.

Patented Sept. 4, 1951

2,566,329

UNITED STATES PATENT OFFICE 2,566,329

TIRE CASING OR SIMILAR LAMINATED ARTICLE

George C. Hessney, Akron, and John W. Martindale, Cuyahoga Falls, Ohio, assignors to The B. F. Goodrich Company, New York, N. Y., a corporation of New York Application May 27, 1947, Serial No. 750,786

14 Claims. (Cl. 152—330)

This invention relates to a construction for a laminated article having a light-colored layer as one component thereof disposed in contact with a layer containing migratory staining material. The invention is particularly concerned with a tire casing or similar laminated article including a layer of a composition containing a migratory staining material which normally would migrate into adjacent layers and a light-colored layer disposed in contact therewith, and comprising a composition adapted to retard migration of material which normally would stain, discolor or otherwise deleteriously affect light-colored compositions.

The manufacture of rubber articles having a light-colored portion in combination with a portion containing migratory staining material has heretofore entailed considerable difficulty. Most vulcanized rubbers such as natural rubber, rubbery copolymers of butadiene and styrene or of butadiene and acrylonitrile and similar rubbers are pervious to migratory staining materials which are frequently and desirably employed in rubber compositions, and conventional light-colored compositions of such rubbers are badly discolored by prolonged contact with compositions containing staining material due to migration of the material into the light-colored layer. The staining is especially pronounced after prolonged exposure of the light-colored portion to sunlight as for example in the use of a white sidewall tire in regular service on an automobile.

White rubber compositions such as are used in the white sidewall portions of tires are badly stained by a variety of materials. For example, white rubber compositions are normally stained by almost all the common anti-oxidants now available for use in rubber compositions, as well as by many of the common accelerators of vulcanization, softeners, oils, and other common rubber compounding materials. In addition, reclaimed rubber which is frequently desirably used in many rubber compositions, normally contains a number of staining materials many of which are not readily identifiable.

In many cases it is neither feasible nor desirable to compound all the layers of a laminated article so that no migratory staining material is included in any of the layers since to do so would necessitate sacrificing certain desirable physical properties imparted to the composition by such staining materials. It is therefore an object of this invention to provide an article wherein light-colored compositions may be used in contact with compositions containing migratory staining materials in a unitary construction wherein the light-colored compositions are not stained by the normally migratory material. Other objects will be apparent from the description which follows.

We have discovered that the foregoing objects may be attained by an article which comprises a layer of a vulcanized composition including migratory staining materials and a rubber pervious to said staining material, and a light-colored layer in contact therewith comprising a vulcanized composition including a rubbery copolymer of a major proportion of an isoolefin having from 4 to 7 carbon atoms and a minor proportion of an open-chain conjugated diolefin having from 4 to 8 carbon atoms together with a rubber compatible with the above-defined rubbery copolymer present in an amount equal to from $\frac{1}{25}$ to $1\frac{1}{2}$ times the weight of said copolymer.

This invention may be embodied in any laminated article and is particularly applicable for use in tire casings having a carcass desirably containing migratory staining materials and having white sidewall portions normally subject to staining.

The invention will be described in detail with reference to a tire casing for purposes of illustration, but it will be understood that the invention may be embodied in any laminated rubber article.

A tire construction embodying the invention is illustrated in the accompanying drawing in which the single figure is a fragmentary sectional perspective view of a white sidewall tire, a portion of the sidewall being stripped back for clarity of illustration.

The tire construction illustrated in the accompanying drawing includes bead portions 10, 10, carcass portion 11 comprising a plurality of plies or rubberized cord fabric, white sidewall portions 12, 12 and tread portion 13 which extends down over the shoulders of the tire to join the sidewall portion.

As will be described more fully hereinafter, the carcass portion 11 comprises a vulcanized composition which includes one or more migratory staining materials and rubber pervious to said materials. Normally such staining material would migrate from the carcass portion into white sidewall portions in contact with the carcass and cause severe staining of the sidewall.

The white sidewall portions 12, 12 may be 0.010–0.5" thick or thicker and are preferably 0.1" thick. In accordance with this invention the sidewall portions comprise a vulcanized composition adapted to effectively block or retard migration of the staining material. Such vulcanized compositions comprise a rubbery copolymer of a major proportion, i. e., over 50% by weight, of an isoolefin having from 4 to 7 carbon atoms with a minor proportion of an open-chain conjugated diolefin having from 4 to 8 carbon atoms together with a rubber compatible with the rubbery copolymer present in an amount equal to from 1/25 to 1½ times the weight of the copolymer. Desirably the sidewall comprises a vulcanized composition in which 40% to 96% by weight of the rubber is a rubbery copolymer of a major proportion, i. e. over 50% by weight, of isobutylene and a minor proportion of isoprene. Preferably the copolymer consists of from 70 or 80 to 99½ parts by weight of an isomonoolefin such as isobutylene or ethyl methyl ethylene copolymerized with from ½ to 20 or 30 parts by weight of an open-chain conjugated diolefin such as isoprene; butadiene-1,3; piperylene; 2,3-dimethyl butadiene-1,3; 1,2-dimethyl butadiene-1,3 (or 3-methyl pentadiene-1,3); 1,3-dimethyl butadiene-1,3; 1-ethyl butadiene-1,3 (or hexadiene-1,3); 1,4-dimethyl butadiene-1,3 (or hexadiene-2,4); the copolymerization being effected by the usual method of copolymerizing such monomers as disclosed in detail in U. S. Patents 2,356,128, 2,356,129 and 2,356,130 to Thomas and Sparks. Typical examples of these synthetic rubbers are known to the trade as "GR–I," "Butyl A," "Butyl B," "Butyl C," and "Flexon." For purposes of brevity such copolymers will hereinafter be referred to as "Butyl" rubber.

The sidewall composition in addition to the "Butyl" rubber also contains another rubber which may be one normally pervious to migratory staining material. The migration of staining material into the sidewall is effectively retarded by the "Butyl" rubber provided the other rubber or rubbers are present in an aggregate amount not greater than 1½ times the weight of "Butyl" rubber. "Butyl" rubber alone provides an effective non-staining sidewall rubber but it is necessary and desirable to use another rubber compatible with the "Butyl" rubber in the sidewall composition to promote adhesion of the sidewall to the carcass for which purpose the rubber must be present in an amount at least equal to 1/25 the weight of "Butyl" rubber.

The "Butyl" rubber effectively retards migration of staining material in amounts as low as 40% by weight of the total rubber in the composition and blocks migration almost completely in amounts of 70% or higher. The rubbers used to promote adhesion are efficacious in aggregate amounts as low as 1/25 the weight of the "Butyl" rubber and best results are obtained when such rubbers are used in aggregate amounts equal to from ¼ to ⅔ the weight of "Butyl" rubber.

The rubber or rubbers used in conjunction with the "Butyl" rubber to promote adhesion may include any vulcanizable rubber compatible with the "Butyl" rubber; and of such rubbers, natural rubber and neoprene are particularly suitable. The synthetic rubbers known as neoprene include any rubbery polymer of a chlorobutadine-1,3 such as 2-chlorobutadiene-1,3 or 2,3-chlorobutadiene-1,3 or a copolymer of such a chlorobutadiene-1,3 with a lesser amount of a monomer copolymerizable therewith such as isoprene, styrene, acrylonitrile or butadiene-1,3. Typical examples of these rubbery materials are known to the trade as "Neoprene E," "Neoprene G," "Neoprene GN," "Neoprene KN," "Neoprene I," "Neoprene Z," "Neoprene MR," "GR—M" and "GR—M—10."

Rubbery copolymers of butadiene and styrene, of butadiene and acrylonitrile may be used, particularly if used in conjunction with one of the preferred rubbers.

The sidewall composition, in addition to the rubbery material, may contain any of the commonly used compounding ingredients for rubbers including vulcanizing agents and accelerators therefor, softeners, fillers, reinforcing materials, etc. The "Butyl" rubber must be present in an amount equal to at least 10% by weight of the total weight of the composition.

In practicing this invention the carcass portion 11 of the tire may be of any desired composition including one or more staining materials, reclaimed rubber, etc., in addition to the commonly employed reinforcing materials, vulanizing agents, accelerators therefor, fillers, etc. The composition of the rubber used in the tread and bead portions may of course be according to any desired compounding recipe.

A tire embodying this invention is built up from its constituent parts and vulcanized in the usual manner by which the several parts are integrally united into a unitary structure.

Typical examples of compositions which may be used for the carcass and sidewall portions will be described but it will be understood that such recipes are merely illustrative and are not intended to limit the scope of this invention but that the materials specified may be substituted and/or supplemented by various other materials and that all such materials may be employed in various proportions in accordance with usual rubber compounding practices and as defined in the appended claims.

*Non-staining white sidewall composition*

| Material: | Parts by weight |
|---|---|
| "Butyl" rubber (80:20 copolymer of isobutylene and isoprene) | 70.0 |
| Natural rubber | 10.0 |
| Neoprene (Rubbery polychloroprene) | 20.0 |
| Fatty acid | 1.0 |
| Zinc oxide | 50.0 |
| Paraffin | 0.75 |
| Titanium dioxide | 20.0 |
| Precipitated calcium carbonate | 30.0 |
| Ultramarine blue | 0.15 |
| Sulphur | 2.0 |
| 2-Mercapto benzothiazole | 0.5 |
| Tetramethyl thiuram disulfide | 1.0 |
| Total | 205.40 |

*Carcass composition*

| Material: | Parts by weight |
|---|---|
| Natural rubber | 40.0 |
| Butadiene styrene rubber (75:25 copolymer) | 40.0 |
| Reclaimed rubber (whole tire) | 40.0 |
| Zinc oxide | 3.0 |
| Carbon black | 30.0 |
| Stearic acid | 1.0 |
| Light mineral oil | 5.0 |
| Pine tar | 5.0 |
| Sulphur | 3.0 |
| Phenylbetanaphthylamine | 0.5 |
| Benzothiazyl disulfide | 0.8 |
| Total | 168.3 |

The above compositions are mixed in the usual manner either on a mill or in an internal mixer. The carcass composition contains a variety of normally migratory staining material. For example, whole tire reclaimed rubber contains migratory staining materials of various and somewhat indeterminate character. Likewise pine tar and phenylbetanaphthylamine would normally stain white rubber compositions.

The carcass composition is calendered on a suitable cord fabric preferably of the weftless type and a number of layers of the resulting rubberized fabric are plyed together to form a tire carcass. The white sidewall composition is extruded into suitably shaped strips which are positioned on the sides of the carcass in direct contact with the carcass. A conventional rubber tread member is placed over the crown of the carcass extending downwardly over the shoulders thereof to abut the white sidewall portion. The assembled tire is then vulcanized in the conventional manner by heating for 15 minutes at 280° F. to yield a unitary structure. Vulcanization may be effected, of course, at 240—340° for 10–16 minutes in accordance with known vulcanization cycles.

When the above carcass and sidewall compositions are employed in a tire embodying this invention with the sidewall in direct contact with a portion of the carcass there is little discoloration of the white sidewall even after several weeks' exposure to sunlight. A tire having a sidewall composition in which the rubber is composed exclusively of a pervious rubber such as natural rubber would begin to show staining of the sidewall in about a week and the sidewall would rapidly darken to a tan color.

This invention is applicable to any laminated article comprising a layer of a light-colored rubber composition in contact with a layer of a rubber composition containing migratory staining material. The composition of the sidewall layer may be varied widely in accordance with usual compounding technique provided the rubber present comprises from 40% to 96% by weight of "Butyl" rubber as defined heretofore.

Further variations and modifications may be effected within the spirit and scope of the invention as defined in the appended claims.

We claim:

1. An unvulcanized vulcanizable article comprising a layer of a rubbery composition normally pervious to migratory staining material containing migratory staining material, and a layer in contact with said first-named layer comprising a rubbery copolymer of a major proportion of an isoolefin having from 4 to 7 carbon atoms with a minor proportion of an open-chain conjugated diolefin having from 4 to 8 carbon atoms and a vulcanizable rubber compatible with said copolymer present in an amount equal to from $1/25$ to $1\frac{1}{2}$ times the weight of said copolymer, each said layer containing a vulcanizing agent therefor.

2. An unvulcanized vulcanizable article comprising a body of a rubbery composition normally pervious to migratory staining material containing migratory staining material, a body of a light-colored composition disposed in contact with said first-named body comprising a rubbery copolymer of a major proportion of an isoolefin having from 4 to 7 carbon atoms with a minor proportion of an open-chain conjugated diolefin having from 4 to 8 carbon atoms and a vulcanizable rubber compatible with said copolymer present in an amount equal to from $1/25$ to $1\frac{1}{2}$ times the weight of said copolymer, each said composition containing a vulcanizing agent therefor.

3. A laminated article of manufacture comprising a light-colored layer and a layer containing migratory staining material in contact therewith, said layer containing migratory staining material comprising a vulcanized rubber pervious to said staining material, said light-colored layer comprising a vulcanized composition including a rubbery copolymer of a major proportion of an isoolefin having from 4 to 7 carbon atoms with a minor proportion of an open-chain conjugated diolefin having from 4 to 8 carbon atoms and a rubber compatible with said rubbery copolymer present in an amount equal to from $1/25$ to $1\frac{1}{2}$ times the weight of said copolymer.

4. A unitary vulcanized article of manufacture comprising a light-colored layer and a layer containing migratory staining material in contact therewith, said layer containing migratory staining material comprising a rubber pervious to said staining material, said light-colored layer comprising a rubbery copolymer of a major proportion of isobutylene with a minor proportion of isoprene and a rubber compatible with said rubbery copolymer present in an amount equal to from $1/25$ to $1\frac{1}{2}$ times the weight of said copolymer.

5. A unitary vulcanized article of manufacture comprising a light-colored layer and a layer containing migratory staining material in face-to-face contact, said layer containing migratory staining material comprising a vulcanized rubber pervious to said staining material, said light-colored layer comprising a vulcanized composition including a rubbery copolymer of from 80 to $99\frac{1}{2}$ parts by weight of isobutylene with from $\frac{1}{2}$ to 20 parts by weight of isoprene and rubber compatible with said rubbery copolymer present in an amount equal to from $1/25$ to $1\frac{1}{2}$ times the weight of said copolymer.

6. A unitary vulcanized article of manufacture comprising a light-colored layer and a layer containing migratory staining material in contact therewith, said layer containing migratory staining material comprising a rubber pervious to said staining material, said light-colored layer comprising a rubbery copolymer of a major proportion of an isoolefin having from 4 to 7 carbon atoms with a minor proportion of an open-chain conjugated diolefin having from 4 to 8 carbon atoms and a rubbery polymer of chloroprene present in an amount equal to from $1/25$ to $1\frac{1}{2}$ times the weight of said copolymer.

7. A tire casing including a light-colored sidewall portion in contact with a carcass portion containing migratory staining material and a rubber pervious to said staining material, said sidewall portion comprising a rubbery copolymer of a major proportion of an isoolefin having from 4 to 7 carbon atoms with a minor proportion of an open-chain conjugated diolefin having from 4 to 8 carbon atoms and a rubber compatible with said rubbery copolymer present in an amount equal to from $1/25$ to $1\frac{1}{2}$ times the weight of said copolymer.

8. A tire casing including a light-colored sidewall portion in contact with a carcass portion containing migratory staining material and a rubber pervious to said staining material, said sidewall portion comprising a rubbery copolymer of a major proportion of isobutylene with a minor proportion of isoprene and a rubber compatible with said rubbery copolymer present in an amount equal to from $1/25$ to $1\frac{1}{2}$ times the weight of said copolymer.

9. A unitary vulcanized tire casing including a carcass portion and a light-colored sidewall portion overlying a zone of said carcass portion in contact therewith, said carcass portion comprising a migratory staining material and a rubber pervious to said staining material, said sidewall portion comprising a rubbery copolymer of from 80 to 99½ parts by weight of isobutylene with from ½ to 20 parts by weight of isoprene and a rubber compatible with said rubbery copolymer present in an amount equal to from 1/25 to 2½ times the weight of said copolymer.

10. A tire casing including a carcass portion and a light-colored sidewall portion overlying a zone of said carcass portion in contact therewith, said tire casing being a unitary vulcanized article, said carcass portion comprising a vulcanized composition including a migratory staining material and a rubber normally pervious to said staining material, said sidewall portion comprising a vulcanized composition including a rubbery copolymer of a major proportion of isobutylene with a minor proportion of isoprene and a rubbery chloroprene polymer present in an amount equal to from ¼ to ⅔ the weight of said rubbery copolymer.

11. A tire casing comprising a unitary vulcanized article including a carcass portion and a light-colored sidewall portion overlying a zone of said carcass portion in contact therewith, said carcass portion comprising a composition including a migratory staining material and a rubber normally pervious to said staining material, said sidewall portion comprising a composition including a rubbery copolymer of from 80 to 99½ parts by weight of isobutylene with from ½ to 20 parts by weight of isoprene and an aggregate amount of natural rubber and a rubbery chloroprene polymer equal to from ¼ to ⅔ the weight of said rubbery copolymer.

12. A unitary vulcanized article of manufacture comprising a light-colored layer and a layer containing migratory staining material in face-to-face contact, said layer containing migratory staining material comprising a vulcanized rubber pervious to said staining material, said light-colored layer comprising a vulcanized composition including a rubbery copolymer of from 80 to 99½ parts by weight of isobutylene with from ½ to 20 parts by weight of isoprene and natural rubber present in an amount equal to from 1/25 to 1½ times the weight of said copolymer.

13. A tire casing including a light-colored sidewall portion in contact with a carcass portion containing migratory staining material and a rubber pervious to said staining material, said sidewall portion comprising a rubbery copolymer of a major proportion of an isoolefin having from 4 to 7 carbon atoms with a minor proportion of an open-chain conjugated diolefin having from 4 to 8 carbon atoms and natural rubber present in an amount equal to from 1/25 to 1½ times the weight of said copolymer.

14. A unitary vulcanized tire casing including a carcass portion and a light-colored sidewall portion overlying a zone of said carcass portion in contact therewith, said carcass portion comprising a migratory staining material and a rubber pervious to said staining material, said sidewall portion comprising a rubbery copolymer of from 80 to 99½ parts by weight of isobutylene with from ½ to 20 parts by weight of isoprene and natural rubber present in an amount equal to from 1/25 to 2½ times the weight of said copolymer.

GEORGE C. HESSNEY.
JOHN W. MARTINDALE.

REFERENCES CITED

The following references are of record in the file of this patent:

UNITED STATES PATENTS

| Number | Name | Date |
|---|---|---|
| 2,240,856 | Phillips | May 6, 1941 |
| 2,313,945 | Kellog et al. | Mar. 16, 1943 |
| 2,467,322 | Lightbown | Apr. 12, 1949 |
| 2,471,905 | Smith | May 31, 1949 |

FOREIGN PATENTS

| Number | Country | Date |
|---|---|---|
| 112,875 | Australia | 1941 |